United States Patent
Viswanathan

(10) Patent No.: US 11,972,390 B1
(45) Date of Patent: Apr. 30, 2024

(54) MULTI-STAGE OPTIMIZATION OF TRANSPORTATION PLAN ASSOCIATED WITH A TRANSPORTATION NETWORK

(71) Applicant: Amazon Technologies, Inc., Seattle, WA (US)

(72) Inventor: Prem Kumar Viswanathan, Luxembourg (LU)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/212,138

(22) Filed: Mar. 25, 2021

(51) Int. Cl.
G06Q 10/0834 (2023.01)
G06Q 10/04 (2023.01)
G06Q 30/0202 (2023.01)

(52) U.S. Cl.
CPC ......... G06Q 10/0834 (2013.01); G06Q 10/04 (2013.01); G06Q 30/0202 (2013.01)

(58) Field of Classification Search
CPC ......... G06Q 10/0834; G06Q 10/08355; G06Q 30/0202; G06Q 10/04; G06Q 10/047; G06Q 10/85; G06Q 50/28; G06Q 50/30
See application file for complete search history.

(56) References Cited

U.S. PATENT DOCUMENTS

| | | | | |
|---|---|---|---|---|
| 8,386,397 B1* | 2/2013 | Agarwal | ............... | G06Q 10/083 705/330 |
| 8,560,461 B1* | 10/2013 | Tian | ............... | G06Q 10/087 705/332 |
| 9,619,775 B1* | 4/2017 | Saito | ............... | G06Q 10/08345 |
| 10,634,502 B2* | 4/2020 | Ho | ............... | G01C 21/3438 |
| 2002/0019759 A1* | 2/2002 | Arunapuram | ............... | G06Q 30/04 705/7.26 |
| 2004/0084526 A1* | 5/2004 | Knowles | ............... | G07F 17/13 235/382 |
| 2004/0153379 A1* | 8/2004 | Joyce | ............... | G06Q 10/08 705/28 |

(Continued)

OTHER PUBLICATIONS

Ghomi, "Cross-Docking: A Proven LTL Technique to Help Suppliers Minimize Products' Unit Costs Delivered to the Final Customers" The University of Mississippi Department of Marketing, Dec. 2018 (Year: 2018).*

*Primary Examiner* — Jeff Zimmerman
*Assistant Examiner* — Matthew Parker Goodman
(74) *Attorney, Agent, or Firm* — Kilpatrick Townsend & Stockton LLP

(57) ABSTRACT

Systems and methods for optimizing a transportation plan for a transportation network are described. In an example, a computer system determines a forecasted demand for transporting items between a source node and a destination node of a transportation network and a set of constraints associated with a handling node of the transportation network. The computer system generates a transportation plan that comprises a network path including the handling node and a type of item handling at the handling node. In a first stage of optimization, an optimization model of the computer system selects the network path from network paths. In a second stage of optimization, the optimization model selects the type of item handling from types of item handling available at the handling node. The optimization model uses the network paths and the types of item handling as variables.

20 Claims, 9 Drawing Sheets

(56) References Cited

U.S. PATENT DOCUMENTS

| | | | | |
|---|---|---|---|---|
| 2005/0149453 | A1* | 7/2005 | Amling | G06Q 10/0833 |
| | | | | 705/60 |
| 2005/0246192 | A1* | 11/2005 | Jauffred | G06Q 10/08355 |
| | | | | 705/13 |
| 2006/0265234 | A1* | 11/2006 | Peterkofsky | G06Q 10/063 |
| | | | | 705/330 |
| 2010/0287073 | A1* | 11/2010 | Kocis | G06Q 10/047 |
| | | | | 705/28 |
| 2012/0323633 | A1* | 12/2012 | Chowdhary | G06Q 10/087 |
| | | | | 705/7.31 |
| 2016/0189102 | A1* | 6/2016 | Schreiber | G06Q 10/047 |
| | | | | 705/338 |
| 2019/0146496 | A1* | 5/2019 | Woodrow | G06Q 10/08 |
| | | | | 701/25 |
| 2020/0349511 | A1* | 11/2020 | Seaver | G06Q 10/06315 |
| 2021/0264553 | A1* | 8/2021 | Gajnutdinov | G06Q 50/30 |
| 2021/0319371 | A1* | 10/2021 | Ito | G06Q 10/08345 |
| 2021/0334745 | A1* | 10/2021 | Nomura | G06Q 10/0836 |
| 2022/0036234 | A1* | 2/2022 | Neumann | G06N 20/00 |

* cited by examiner

MULTI-STAGE OPTIMIZATION OF TRANSPORTATION PLAN ASSOCIATED WITH A TRANSPORTATION NETWORK

BACKGROUND

More and more users and entities are turning to online services for day-to-day activities. Many of the services span both the digital world and the physical world. For example, a user may operate a computing device to order an item from a web site. The item may be delivered from a storage facility to a delivery location of the user.

Generally, the delivery of the item may involve multiple physical locations in between the storage facility and the delivery destination. A delivery system may include the in between, physical locations. For example, the item may be delivered from the storage facility to a delivery hub. The delivery hub may also receive a number of items from a number of storage facilities. The items may be sorted for deliveries to respective delivery stations, loaded onto delivery vehicles, and sent forward to the delivery stations. This leg of the delivery may be referred to as the middle mile. One of the delivery stations may be responsible for deliveries to the user's delivery destination. At that delivery station, more refined sorting may occur. Accordingly, the item may be loaded onto a delivery vehicle for the final delivery. This leg of the delivery may be referred to as the last mile.

BRIEF DESCRIPTION OF THE DRAWINGS

Various embodiments in accordance with the present disclosure will be described with reference to the drawings, in which.

DETAILED DESCRIPTION

Figure 1:
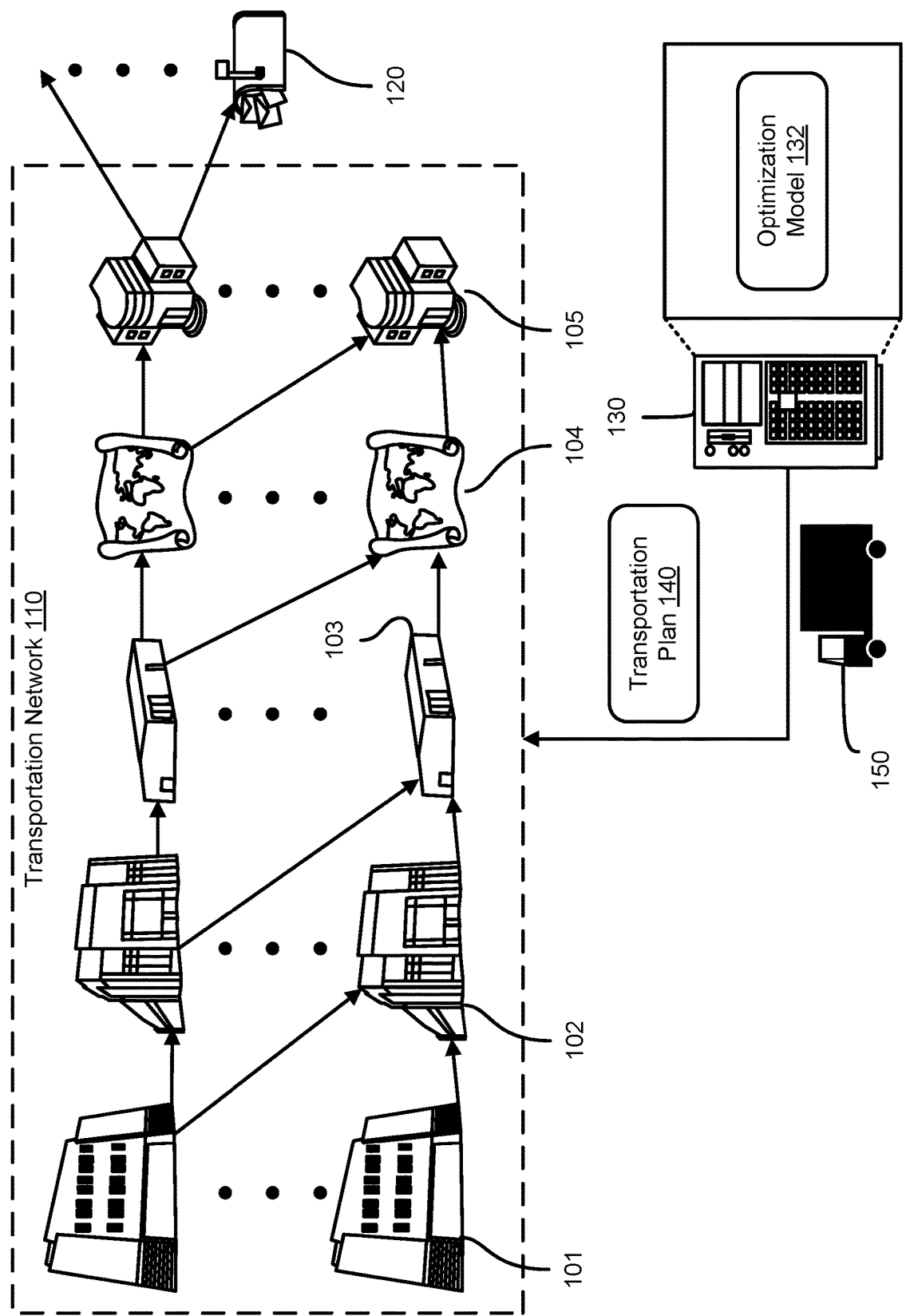
FIG. 1 illustrates an example environment for delivery items to end destinations, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, optimizing a transportation plan associated with a transportation network. An item delivery may include a delivery of a tangible item (generally referred to herein as an item) from a source node to a destination node along a delivery path within the transportation network. The item may be received and handled at different delivery locations within the delivery path prior to reaching the delivery destination. In an example, a computer system determines a forecasted demand for transporting items between a source node and a destination node of the transportation network. The destination node can be a last-mile node immediately prior to delivery of the items to end destinations (e.g., consumer addresses), and the source node may be any node previous to the destination node. The computing system determines a set of constraints associated with a handling node of the transportation network. The handling node can be a node between the source node and the destination node, and the set of constraints can include an item handling throughput for the handling node and a limit on the number of network paths in and/or out of the handling node. The computer system also determines a set of costs associated with the transportation of the items. The computer system generates a transportation plan using an optimization model. In a first stage of optimizing the optimization model, a network path within the transportation network is determined from among multiple network paths. The network path includes the handling node and connects the source node and the destination node. In a second stage of optimizing the optimization model, a type of item handling is selected for the handling node from types of item handling (e.g., sort, cross-dock, store, open, etc.). The network path and the type of item handling make up the transportation plan, which is used by the computer system to control resources of the transportation network.

To illustrate, consider an example of items that are to be transported from a fulfillment center, which can serve as the source node, to a destination node that is located in a geographic area of delivery locations for the items. Connected network paths can be generated that connect the source node to the destination node with varying numbers and locations of handling nodes and varying item handling types at each handling node. An optimization model can receive a forecasted demand of items from the source node to the destination node, node constraints of the handling nodes, a network definition of the transportation network, and time constraints, along with the connected network paths from the source node to the destination node. Optimizing cost, the optimization model can select one connected network path of the connected network paths to be the network path from the source node to the destination node. The optimization model can then optimize cost again, using the selected network path as an input and combinations of types of item handling as variables to select the type of item handling at a handling node. For example, the optimization model can select to sort the items at the handling node.

Embodiments of the present disclosure provide various technological advantages over a conventional computer system that generates a transportation plan for items in a transportation network. For example, the system may generate the plan for a next planning horizon (e.g., a week). The amount of input parameters and constraints may be large (e.g., millions of input data points and millions of constraint data points). Absent the embodied techniques, finding the optimal solution timely support an execution of a plan that uses the solution may be computationally infeasible. In another example, many systems may subscribe to the output of the model. Operations of these systems may be improved. For instance, a management system may plan the delivery-vehicle deployment and usage in an optimized manner. Similarly, an inventory management system may plan for receiving and storing transshipped items in an optimized manner. In yet a further example, the synergetic use of the digital data to manage operations in the physical world may improve such operations. For instance, the physical deployment and usage of a vehicle may be optimized. This may become crucial in various situations. For instance, there may be a situation where some or all of the deployed vehicles may be unmanned vehicles. Such vehicles may autonomously perform certain operations associated with transporting items. In these situations, an optimal plan may become paramount to properly manage the physical deployment and usage of the unmanned vehicles.

FIG. 1 illustrates an example environment for delivery items to end destinations. The environment may include a transportation network 110. Specifically, items may be destined to delivery locations 120 (e.g., end destinations such as consumer addresses). The items may originate from source nodes. A source node is a node within the transportation network 110 from which a delivery of an item can be sourced or start. The transportation network 110 may or may not include the source nodes. Regardless, the delivery paths of the items may involve stops at handling nodes within the transportation network 110 that are between a source node and a destination node. Handling nodes may also be a source node or a destination node. At each handling node, an item may be handled, such as sorted, cross-docked, opened, stored, etc. The decision as to where the item is to be handled and the type of handling may be part of a transportation plan 140 (e.g., a plan that indicates a delivery path within the transportation network 110 from a source node to a destination node within the transportation network 110 and the type of item handling at each handling node along this network path. A destination node is a last node within the transportation network 110 before an item is placed on a delivery vehicle for delivery to an end destination of a consumer. A management system 130 may be configured to dynamically generate the transportation plan 140 based on information related to the volume of items and/or the capacity and desired throughput of the transportation network 110.

As illustrated, the transportation network 110 may include a number of handling nodes. Each handling node may represent a location where an item may be received, processed, and prepared for delivery to a next handling node or to a final delivery location. Handling the item may generally refer to any of receiving, processing, and/or delivery preparation and may be performed using one or more handling systems. A handling system may include a computer system, operator devices (e.g., handheld devices), and/or material handling equipment configured to perform delivery-related actions on an item, such as scanning identifiers (e.g., barcodes), printing and attaching identifiers, sorting, cross-docking, moving, packing, unpacking, stowing, picking, or performing other deliver-related actions.

Some of the handling nodes may be managed by a particular entity, such as a service provider. Other handling nodes may be managed by different entities. All in all, a handling node housing a handling system may be referred to as a handling facility or an item handling facility. FIG. 1 illustrates three types of handling facilities managed by a same service provider: a fulfillment center, a sortation center, and a delivery station. Specifically, a fulfillment center 101 may store items to fulfill customer orders for the items. The transportation network 110 may forwardly connect the fulfillment center 101 to sortation centers 102 and other fulfillment centers 101, among other handling nodes. A sortation center 102 may receive multiple items from one or more fulfillment centers 101 and other source nodes and may sort or cross-dock the items into more refined geographic delivery regions. Sorting items involves separating items into different subsets, in which each subset is to be transported to a different handling node or destination node. Cross-docking involves receiving pre-sorted items and loading the items onto a delivery vehicle that transports the items to a handling node or a destination node for further processing and/or delivery. The transportation network 110 may forwardly connect the sortation center 102 to delivery stations 103 and other sortation centers 102, among other handling nodes. A delivery station 103 may receive multiple items from one or more sortation centers 102 and other source nodes and more refined sorting may occur to prepare for deliveries to specific delivery zones 104. Each delivery zone 104 may represent a geographic area of certain resolution (e.g., corresponding to a certain predefined volume of deliveries or destination locations) and may represent a delivery location having that geographical resolution. Within each zones, multiple housing complexes 105 may exist. Each housing complex 105 may house multiple delivery locations 120 and may represent a destination node responsible for these delivery locations 120.

Each of the handling nodes may be associated with an inventory management system. Additionally or alternatively, the different handling nodes of the transportation network 110 may be associated with an inventory management system. Regardless, the inventory management system may be a computer system in communication with the management system 130 and the handling system(s) over one or more data networks. The inventory management system may track the locations of items, update item records and inventory records, and/or may generate tasks to handle items. In an example, the management system 130 may send a transportation plan 140 to the inventory management system of the transportation network 110. In turn, the inventory management system may distribute the transportation plan 140 to the appropriate handling systems and may, additionally or alternatively, generate and distribute tasks based on the transportation plan 140 and related information to the appropriate handling systems.

Accordingly, an item destined to a delivery location 120 may travel along a delivery path through the transportation network 110. The delivery path may include a sequence of the handling nodes, where each handling node may represent a handling node within the transportation network 110. The sequence may represent a particular order of traveling between the applicable handling nodes. Each handling node may represent a sequence step along the delivery path. For example, the item may travel from one fulfillment center 101, to a sortation center 102, then to a delivery station 103, followed by a delivery zones 104, before reaching a housing complex 105 that contains the delivery location 120. From the housing complex 105, the item may be delivered to the delivery location 120. At each of the handling nodes, the item may be handled by a handling system according to a sequence of steps. Each step may correspond to a task that may be defined by the transportation plan 140. Hence, the delivery path may represent a handling sequence (or more generally referred to as a sequence), where the handling sequence may include an ordered set of steps, and where a step of the handling sequence (e.g., or more generally referred to as a sequence step) may represent a handling node and/or a handling task.

Demand for items that need to be transported between a source node and destination node of the transportation network 110 can be forecasted. A transportation plan 140 is determined for the pair of the source node and the destination node and for other similar pairs. The transportation plan 140 can include, for each source node and destination node and the associated forecasted item demand, a network path and the type of item handling per handling node along the network path. Determining a transportation plan 140 for each source node and destination node pair can be performed globally (e.g., across the entire transportation network 110) in two stages. A first stage involves resolving network paths first to transport the forecasted demand between the source nodes and destination and then a second stage involves resolving the item handling types per network path.

The management system 130 may represent a computer system, such as a server, a cloud computing service, or a back end system, configured to generate a transportation plan 140. Generally, the transportation plan 140 may depend on improving an optimization parameter of the transportation network 110. In other words, if the management system 130 includes an optimization model 132 that is used globally (e.g., for all forecasted demands) in two stages. The first stage can select a network path for each source node and destination node pair and the second stage can select item handling types at each handling node of the selected network paths, where these two stages result in an optimization of the optimization parameter.

The optimization parameter may be defined across various optimization dimensions. Example dimensions may include amount of utilized capacity, achieved throughput, computational burden (e.g., processing and memory utilization associated with sensing, scanning, instructing, and performing other handling-related actions), cost savings (e.g., cost of transportation, manpower, number of touches), volume of items per transportation vehicle, number and/or type of transportation vehicles, and other efficiency-related considerations.

The management system 130 may use an optimization model 132 (e.g., an objective function) that receives a forecasted demand for transporting items between a source node and a destination node of the transportation network 110, a set of constraints associated with a handling node of the transportation network 110, and a set of costs associated with transportation of the items to generate the transportation plan 140. The costs may be costs associated with a transportation method (e.g., airplane, truck or any other transportation type), costs associated with using a certain transportation vehicle capacity (e.g., the volume of items per transportation vehicle), costs associated with a type of item handling, or costs associated with any other aspects of transporting items from the source node to the destination node. The source node can be any location in the transportation network that is a previous location for the items than the destination node. The destination node can be a location immediately prior to the delivery location 120. Handling nodes are intermediate nodes between the source node and the destination node. The transportation plan 140 includes a network path that is within the transportation network 110 and that connects the source node and the destination node. The transportation plan 140 also includes a type of handling at each handling node of the transportation network 110. The types of handling can include a sort, a cross-dock, opening the item, storing the item, etc. A portion of the transportation plan 140 may be sent to a delivery vehicle 150 to indicate the network path and type of item handling at a handling node.

The optimization model 132 may be optimized in two stages. For example, a first stage can select the network path using possible network paths as variables and optimizing an optimization parameter. The second stage can select the type of item handling for the node from types of item handling that are used as variables.

In the interest of clarity of explanation, FIG. 1 illustrates a forward utilization of the transportation network 110 where items may be delivered from source nodes to destination nodes based on customer orders for the items. However, a backward utilization is likewise possible. Specifically, items may be returned to the same source nodes or some other delivery locations within the transportation network 110. In this case, a transportation plan may also be generated to improve delivery (or, more accurately, return) efficiency.

Figure 2:
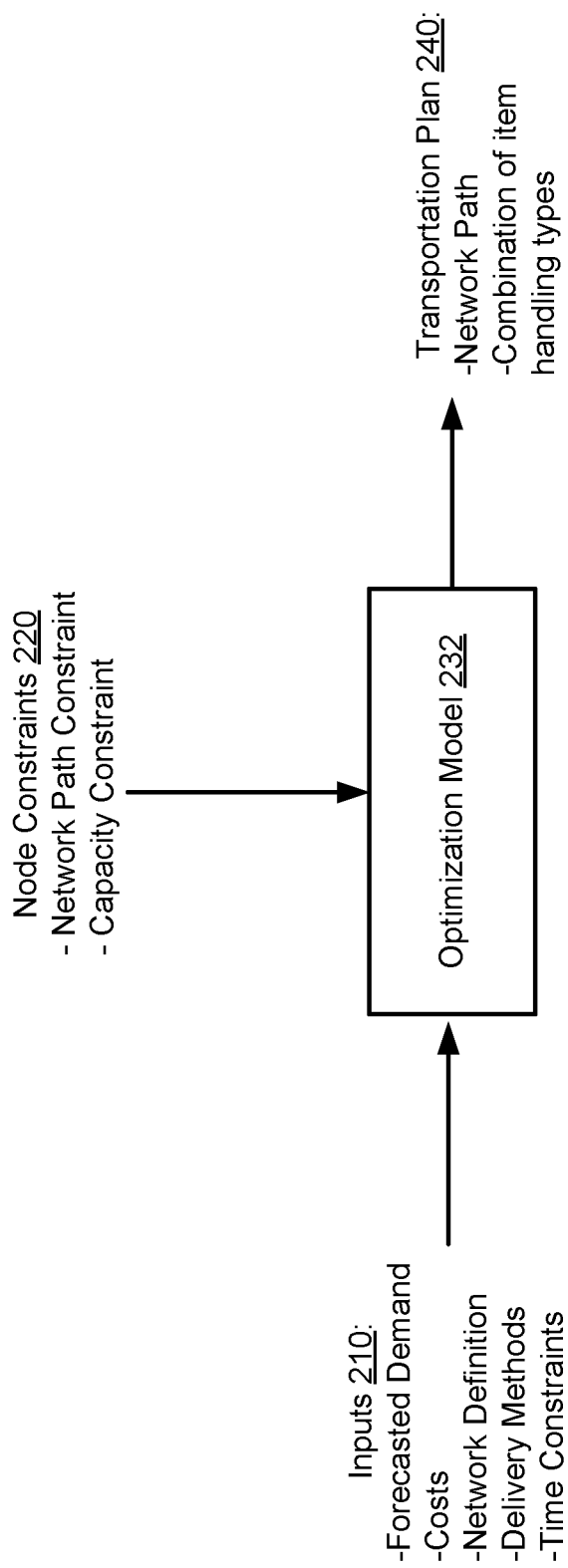
FIG. 2 illustrates an example of an optimization model generating a transportation plan, according to an embodiment of the present disclosure.

FIG. 2 illustrates an example of an optimization model 232 generating a transportation plan 240, according to an embodiment of the present disclosure. The optimization model 232 is an example of the optimization model 132 in FIG. 1, and the transportation plan 240 is an example of the transportation plan 140 in FIG. 1. The optimization model 232 may be executed on a management system, such as management system 130 in FIG. 1.

In an example, the optimization model 232 receives inputs 210. The inputs 210 include a forecasted demand, costs, a network definition, delivery methods, and time constraints. Each of the inputs 210 corresponds to a particular source node and destination node over a period of time. The forecasted demand is a predicted number of items to be transported from the source node to the destination node in the period of time. The costs are costs associated with the transportation of the items from the source node to the destination node, such as cost of delivery vehicles and handling the items. The network definition corresponds to a location of each node in the transportation network and how each of the nodes are connected. The delivery methods refer to how the items are transported between the nodes in the delivery network (e.g., by truck or plane). The time constraints refer to how quickly the items are to be transported between the source node and the destination node. For example, a customer may order an item online with a two-day delivery time. Therefore, the time constraint for the source node of the item and the destination node is two days.

In an example, the optimization model 232 also receives node constraints 220. The node constraints 220 including a network path constraint and a capacity constraint. The capacity constraint can specify how many items a node in the transportation network can handle in a given period of time (e.g., a throughput of a node). The network path constraint can specify a number of network paths into and/or out of a node (may be referred to herein as sortation paths).

The optimization model 232 may be an objective function that is optimized in two stages. The objective function can have variables expressed as:

$x_p^{fi} \in \{0,1\}$: 1 if path p is selected for a demand between a source node and a destination node;

$Vol_{p,t}$: Number of shipments at full capacity for path p at time t;

$w_{od} \in \{0,1\}$: 1 if a source node or a handling node sorts for a handling node or a destination node;

$l_{od} \in \{0,1\}$: 1 if a source node or a handling node ships for a handling node or a destination node;

$Y_{odt}^a$: Number of equipment type (a) at time (t) between the source node and a handling node or a destination node (0 or >1); and $u_{odt}$: Volume departing at time (t) between the source node and a handling node or a destination node (0 or >1).

The objective function can have parameters expressed as:

$vc_s$: variable cost per package at a handling node (s);

$vcx_s$: variable cost per package for cross-docking at a handling node;

$lh_{odt}^a$: cost per truck for equipment type (a);

$MaxSort_o$: maximum number of sorts at a source node (o);

$MaxSortCap_{st}$: maximum sort capacity of handling node (s) at time (t);

$MaxXDCap_o$: maximum cross-dock capacity of handling node (s) at time (t);

$v_f$: average cube for a fulfillment center (f);

$V_a$: cube capacity of equipment type (a);

$s_{fit}$: total shipments from a fulfillment center (f) to an injection node (i) at time (t);

$Contain\_LanePath_p^{od}$: 1 is a given if a lane between a source node (o) and a handling node or a destination node (d) exists in path (p);

$SortPath_p^s$: 1 if a handling node (s) sorts for volume on path (p);

$XdockPath_p^s$: 1 if a handling node (s) cross-docks for volume on path (p); and $Contain\_FCPath_p^f$: 1 is a given if path (p) originates from fulfillment center (f) and is time-constraint feasible.

Based on the variables and the parameters, the objective function can be expressed as: $\min \Sigma_{s,p,t} vc_s SortPath_p^s Vol_{pt} + \Sigma_{s,p,t} vcx_s XdockPath_p^s Vol_{pt} + \Sigma_{a,o,d,t} lh_{odt}^a y_{odt}^a$.

The objective function can be subject to:

(1) $\Sigma_{p,f,t} Contain\_FCPath_p^f Vol_{pt} Contain\_LanePath_p^{od} v_f \geq \Sigma_t u_{odt}$ for each o, d, a, t, $\leq T$ is used if departure items is less than forecasted demand for every time;

(2) $\Sigma_{p,f,t} Contain\_FCPath_p^f Vol_{pt} Contain\_LanePath_p^{od} v_f = \Sigma_t u_{odt}$ for each o, d, a, t, $\leq MAX\_T$ is used if departure items equals the forecasted demand at the end of the time horizon;

(3) $u_{odt} v_o \leq \Sigma_a V_a y_{odt}^a$ for each o, d, t is used if the departure volume cube is less than the equipment cube;

(4) $\Sigma_{p,t} SortPath_p^s Vol_{pt} \leq \Sigma_t MaxSortCap_{st}$ for each s, $t \leq T \in CPT$ hours is the sort capacity at the handling node;

(5) $\Sigma_{f,i} s_{fit} x_p^{fi} = Vol_{pt}$ for each path (p) and time (t) is the volume on each path;

(6) $\Sigma_p x_p^{fi} = 1$ for each demand between a fulfillment center (f) and an injection node (i) selects one path for each demand;

(7) $\Sigma_d w_{fd} \leq MaxSort_f$ for each fulfillment center is the maximum sorts in each fulfillment center and is capped by the number of sorts made to all handling nodes and destination nodes;

(8) $\Sigma_d w_{sd} \leq MaxSort_s$ for each handling node is the maximum sorts at each handling node and is capped by the number of sorts made to all handling nodes and destination nodes;

(9) $l_{oi} \leq w_{oi}$ for each lane between a source node (o) and a destination node (i) specifies the lane exists only if a sort exists;

(10) $\Sigma_a y_{odt}^a \leq M \, l_{od}$ for each land between a source node and a destination node or a handling node specifies that a truck runs only if a lane exists;

(11) $\Sigma_p XdockPath_p^s Vol_{pt} \leq \Sigma_t MaxXDCap_{st}$ for each s and t specifies the cross-dock capacity at a handling node;

(12) $\Sigma_p x_p^{fi} \leq x_P^{fI}$ for each $P \in p$ and $I \in i$ specifies path (p) is selected if and only if path (P) is selected;

(13) $\Sigma_i x_p^{fi} \leq x_P^{Fi}$ for each $P \in p$ and $F \in f$ specifies path (p) is selected if and only if path (P) is selected;

(14) $\Sigma_p x_p^{fi} \leq 1 - x_P^{fI}$ for each $P \in p$ and $I \in i$ specifies path (p) is selected if path (P) is not selected; and

(15) $\Sigma_i x_p^{fi} \leq 1 - x_P^{Fi}$ for each $P \in p$ and $F \in f$ specifies path (p) is selected if path (P) is not selected.

In an example, the optimization model 232 outputs the transportation plan 240. The transportation plan 240 includes a network path per pair of source node and destination node and a combination of item handling types at nodes along the network path. The network path can be a path within the transportation network that connects the source node and the destination node based on the inputs 210 and the node constraints 220. The network path can include one or more handling nodes between the source node and the destination node where items are handled. The combination of item handling types can specify a type of item handling (e.g., sort, cross-dock, store, open) at each handling node of the network path.

The example of FIG. 2 is described for one source node and one destination node. But, there can be multiple source nodes and multiple destination nodes. As such, there can be multiple forecasted demands, multiple costs, etc. each for a pair of source and destination nodes. The optimization model 232 can determine the network path and item handling types for each pair of source and destination nodes.

Figure 3:
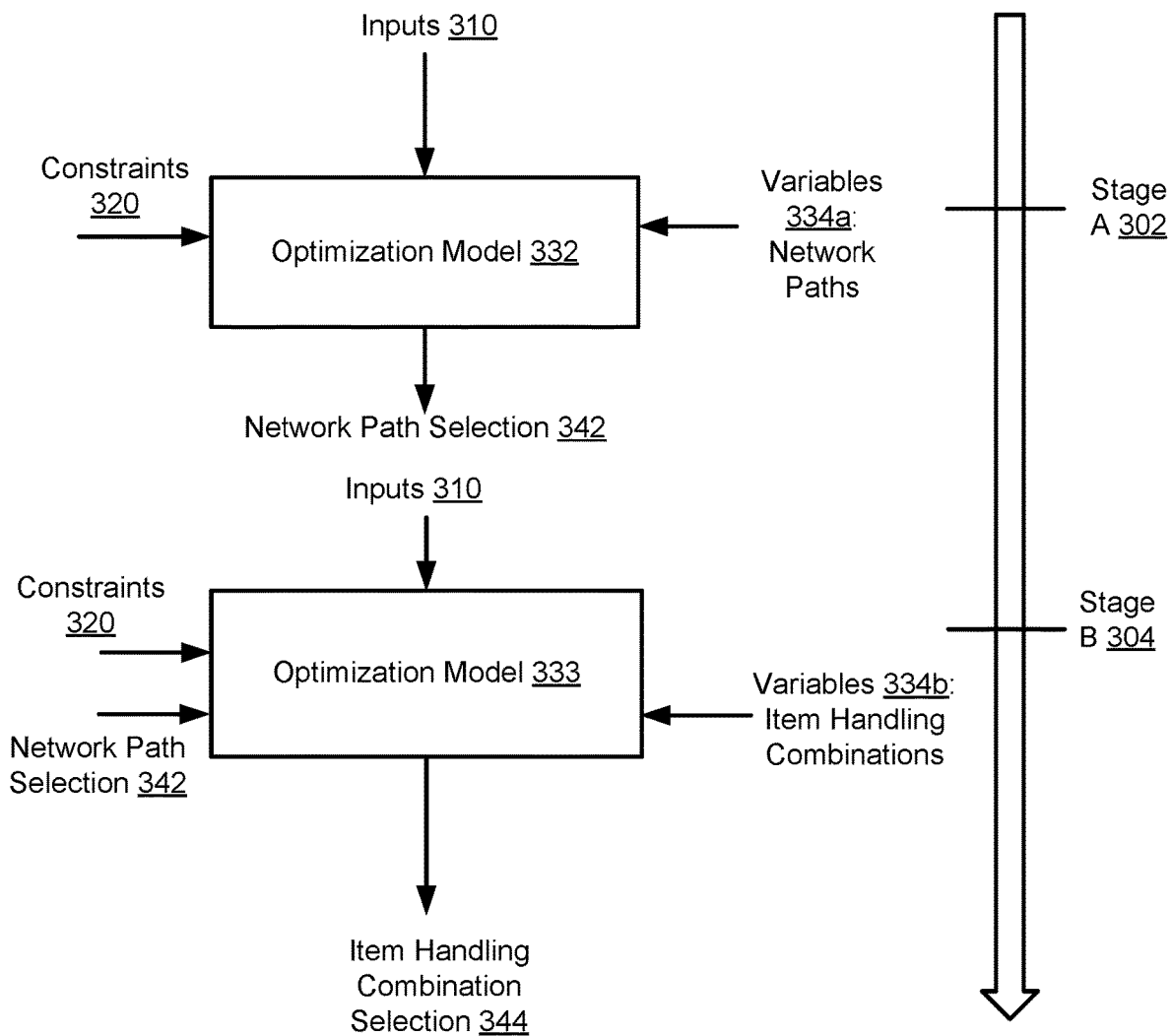
FIG. 3 illustrates an example of stages for using an optimization model to generate a transportation plan, according to an embodiment of the present disclosure.

FIG. 3 illustrates an example of stages for using an optimization model 332 to generate a transportation plan, according to an embodiment of the present disclosure. The optimization model 332 may be executed on a management system, such as management system 130 in FIG. 1.

In an example, a transportation plan is generated in two stages, stage A 302 and stage B 304. Each stage may involve different variables to generate a different aspect of the transportation plan. For example, stage A 302 can generate a network path selection 342 and stage B 304 can generate an item handling combination selection 344.

In an example, in stage A 302, the optimization model 332 receives inputs 310 and constraints 320. The inputs 310 include a forecasted demand for a source node and a destination node over a period of time, costs of transporting the items from the source node to the destination node in the time period, a network definition for locations of nodes and how the nodes are connected in the transportation network, delivery methods between the nodes, and time constraints for transporting the items between the source node and the destination node. The constraints 320 specify how many items a node in the transportation network can handle in a given period of time. The node constraints 220 also specify a number of sortation paths out of a node in the transportation network.

In an example, the optimization model 332 also receives variables 334a in stage A 302. The variables 334a include network paths between the source node and the destination node. The network paths may be all of the connected paths between the source node and the destination node, or the connected paths may be first filtered into candidate paths that satisfy a time constraint for transporting the items and the candidate paths can be the variables 334a.

In an example, in stage A 302, the optimization model 332 determines a network path selection 342, which specifies the path between the source node and the destination node based on the constraints 320, the inputs 310, and the variables 334a. The optimization model 332 can optimize an optimization parameter (e.g., cost, time, etc.) to determine the network path selection 342.

In an example, an optimization model 333 receives the inputs 310 and the constraints 320 again in stage B 304. The inputs 310 and the constraints 320 are the same in stage B 304 as they were stage A 302. The optimization model 333 is the same as the optimization model 332, but the optimization model 333 also receives the network path selection 342 from stage A 302 in stage B 304. The variables 334b in stage B 304 are item handling combinations. The variables 334b can include candidate combinations of the types of item handling across nodes of the selected network path. The optimization model 332 determines an item handling combination selection 344, which specifies the types of item handling at each node in the selected network path. The optimization model 332 optimizes the optimization parameter to determine the item handling combination selection 344.

The network path selection 342 and the item handling combination selection 344 together make up a transportation plan for transporting items from the source node to the destination node. The transportation plan can be sent to delivery vehicles and/or nodes in the transportation network to control resources of the transportation network.

In an example, the transportation plan may be entirely generated in the first stage for network paths with a single handling node. For example, the optimization model 332 in stage A 302 determines the network path selection 342 includes a single handling node. The optimization model 332 then determines an item handling combination for the network path selection 342 from candidate item handling combinations available at the single handling node.

The above describes the optimization of a transportation plan that includes a source node and a destination node in the interest of clarity of explanation. However, the embodiments of the present disclosure are not limited as such. Instead, they similarly apply to the optimization of a transportation plan that includes multiple source nodes and/or multiple destination nodes. In particular, the forecasted demand, costs, and constraints can be determined for each pair of source node and destination nodes. Such information of all the pairs can be processed by the optimization model 332 in the two stages A 302 and B 304, such as the optimization is performed at the global scale (e.g., across the entire transportation network). In this way, a first network path between a first pair may be influenced by the selection of a second network path of a second node during the stage A 302 if doing so results in the optimization. The same holds also true of the second stage B 304 (e.g., the selection of item handling type for a first network path at a first handling node shared with a second network path may be influenced by the item handling types selected for the second network path at the first handling node and/or the handling types selected for other handling nodes along the first network path).

Figure 4:
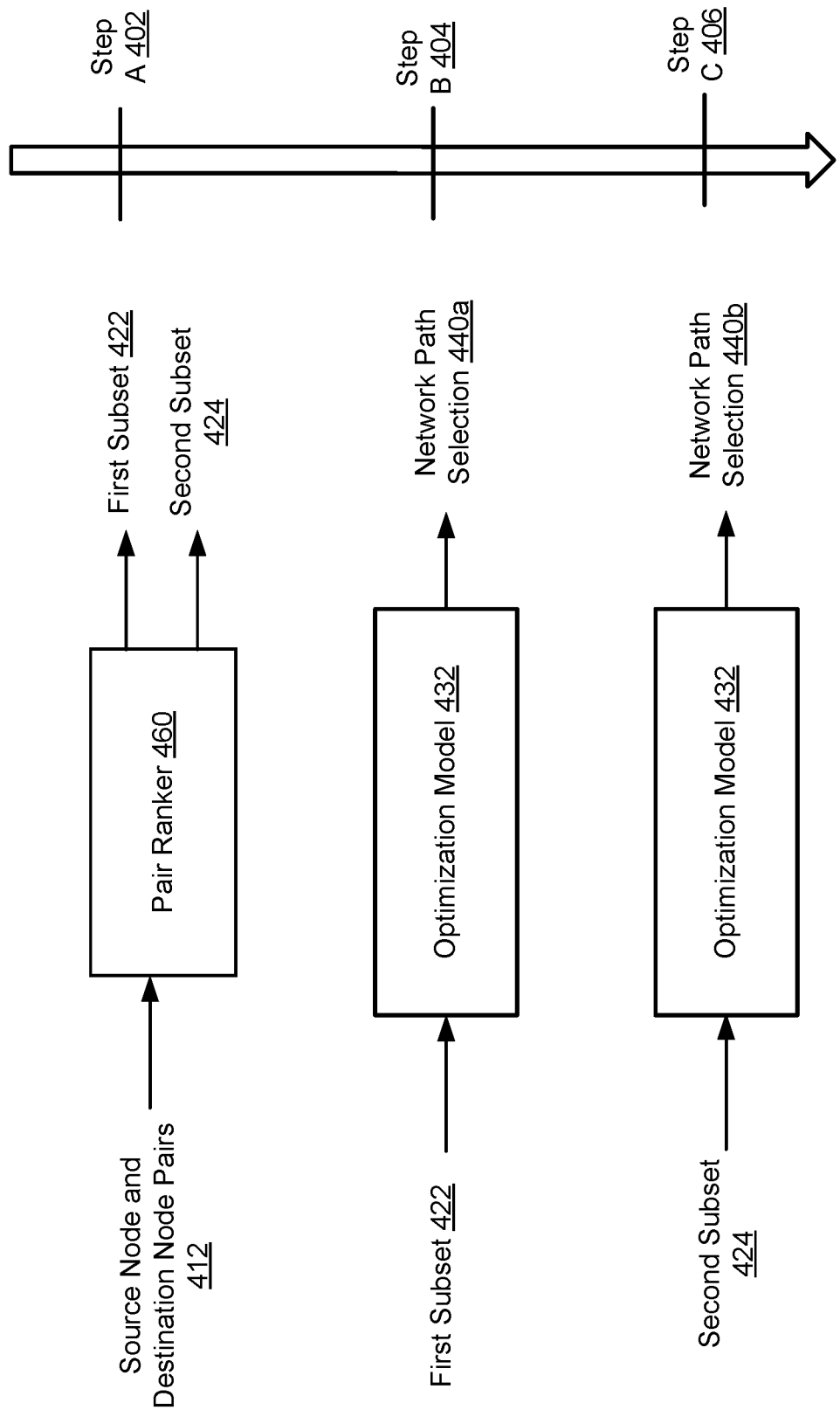
FIG. 4 illustrates an example of ranking source node and destination node pairs prior to determining transportation plans, according to an embodiment of the present disclosure.

FIG. 4 illustrates an example of ranking source node and destination node pairs prior to determining transportation plans, according to an embodiment of the present disclosure. A management system, such as the management system 130 in FIG. 1, can include a pair ranker 460, which can be an algorithm capable of ranking source node and destination node pairs 412. The steps of FIG. 4 are sub-steps performed in stage A 302 of FIG. 3. In particular, these steps allow an iterative process for determining subsets of source node and destination node pairs and selecting the network paths thereof.

In an example, the management system performs step A 402, in which the pair ranker 460 receives the source node and destination node pairs 412. There can be one source node and destination node pair for each combination of source node and destination node. The pair ranker 460 can generate a ranking of the source node and destination node pairs 412. The ranking may be based on a total volume of items (e.g., forecasted demand) and a total number of item handlings to handle items across the network path between each source node and destination node pair. The pair ranker 460 can determine a ratio of the total volume of items to the total number of item handlings to determine a ranking value of each source node and destination node pair. The pair ranker 460 outputs a ranking of the source node and destination node pairs 412, where pairs with a higher ranking value can be ranked higher.

In an example, the pair ranker 460 outputs at least a first subset 422 and a second subset 424 of the source node and destination node pairs 412. The first subset 422 can include source node and destination node pairs with a higher ranking value than node pairs in the second subset 424. The pair ranker 460 may output the ranking and split the source node and destination node pairs 412 according to the ranking values.

In step B 404, an optimization model 432 receives the first subset 422 and determines network path selection 440a. Each source node and destination node pair in the first subset 422 can be input into the optimization model 432, and a network path selection 440a can be generated for the first subset 422. Thus, the optimization model 432 receives the input (e.g., the pairs of source nodes and destination nodes, the forecasted demands for each of the pairs, the node constrains for each of the pairs, etc.) and outputs the network path selection 440a for the first subset 422 by performing the optimization in the first stage (e.g., stage A 302 in FIG. 3).

In step C 406, the optimization model 432 receives the second subset 424 and determines network path selection 440b. Similar to the first subset 422, each source node and destination node pair in the second subset 424 can be input into the optimization model 432, along with the forecasted demands and node constraints, to generate a network path selection 440b for the second subset 424 in the first stage of optimization. Network path selection 440b for the second subset 424 can be generated subsequent to network path selection 440a for the first subset 422 since the first subset 422 includes node pairs with higher ranking values. The ranking may result in more than two subsets, and the optimization process can be repeated for all such subsets.

The above steps are repeated for all ranked subsets. After the networks paths have been selected for the different subsets, the management system proceeds to the second stage of optimization. In the second stage, the optimization model is run for all of the selected network paths together and not according to the ranked subsets.

Figure 5:
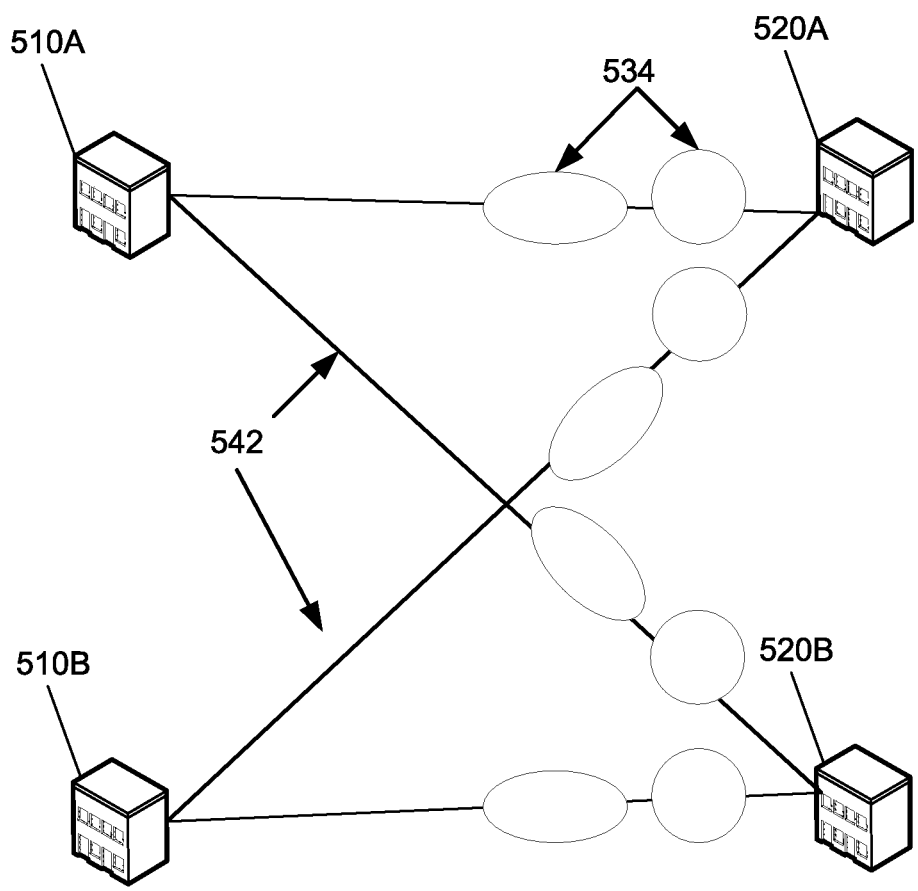
FIG. 5 illustrates an example of a transportation network connecting a source node and a destination node.

FIG. 5 illustrates an example of a transportation network connecting a source node 510a and a destination node 520b. The transportation network includes two network paths 542. A first network path directly connects the source node 510a and the destination node 520b. A second network path includes the source node 510a, a first handling node 520a, a second handling node 510b, and the destination node 520b. Other network paths (not shown) can include the source node 510a, the destination node 520b, and one of the first handling node 520a or the second handling node 510b. The transportation network may additionally include additional handling nodes that can be included in network paths between the source node 510*a* and the destination node 520*b*.

In an example, the transportation network also includes item handling types 534 for each node. A first item handling type (represented by an oval) can be a sort and a second item handling type (represented by a circle) can be a cross-dock.

In an example, a management system (e.g., management system 130 in FIG. 1) can attempt to determine a network path and an item handling type at each node. However, solving for both outputs simultaneously increases the complexity of the problem for an optimization model. Thus, it may be advantageous for the management system to determine the transportation path in two stages, as further described in FIGS. 6 and 7.

Figure 6:
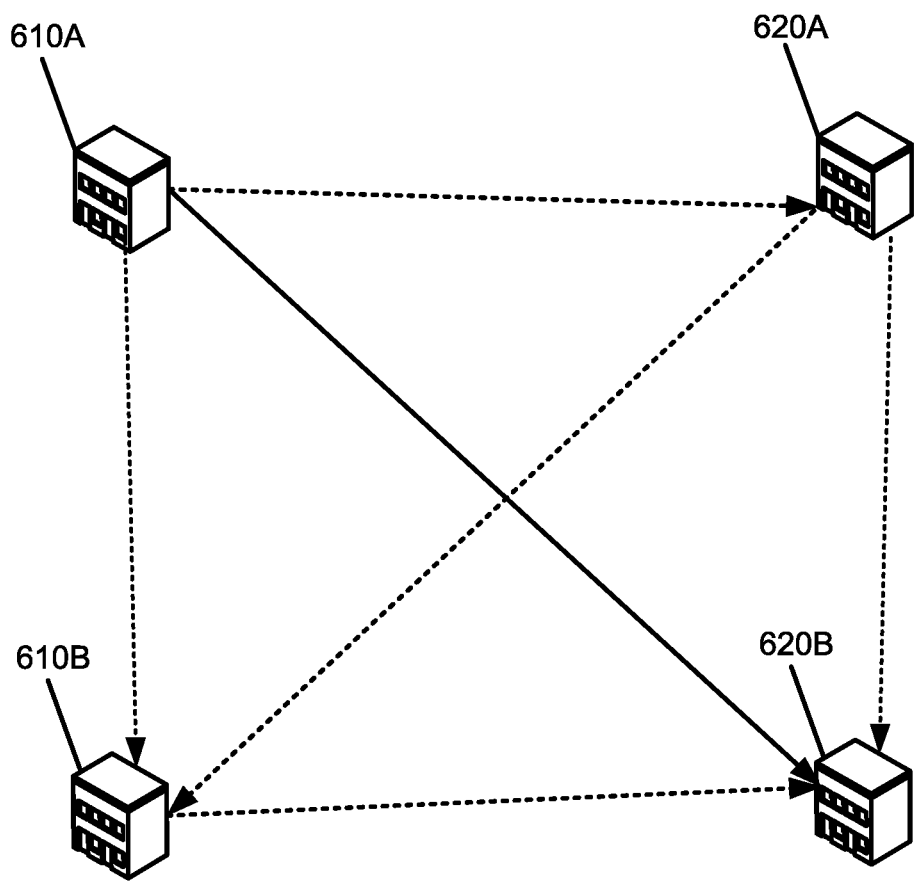
FIG. 6 illustrates an example of determining a network path connecting a source node and a destination node, according to an embodiment of the present disclosure.

FIG. 6 illustrates an example of determining a network path connecting a source node 610*a* and a destination node 620*b*, according to an embodiment of the present disclosure. A management system (e.g., management system 130 in FIG. 1) may determine the network path.

Initially, connected network paths are generated that include each possible path between the source node 610*a* and the destination node 620*b*. The connected network paths are shown in FIG. 6. A first connected path begins at the source node 610*a* and goes directly to the destination node 620*b*. A second connected path begins at the source node 610*a*, goes to a first handling node 620*a*, then to a second handling node 610*b*, and then to the destination node 620*b*. Other connected network paths begin at the source node 610*a*, go through either the first handling node 620*a* or the second handling node 610*b*, and then go to the destination node 620*b*.

In an example, an optimization model (e.g., the optimization model 132 in FIG. 1) determines a network path from the connected network path. The optimization model 132 may filter the connected network paths into candidate network paths based on a set of rules. For examples, the set of rules can specify a time constraint for transporting the items. Any connected network paths that satisfy the time constraint can be filtered into the candidate network paths. Any connected nodes that do not satisfy the time constraint can be discarded from the variables received by the optimization model. The set of rules may additionally or alternatively specify that a connected network path having a total number of handling nodes between the source node 610*a* and the destination node 620*b* is to be considered if the total number is less than a threshold number. For example, the threshold number can be two, so any connected network paths involving a direct connection or one handling node can be considered by the optimization model. The set of rules may additionally specify removing a connected network path with of a total number of handling nodes of the connected network path above the threshold number (e.g., greater than or equal to five). The set of rules may additionally specify that a connected network path is to be removed if one or more handling nodes of the connected network path are at a distance away from the source node 610*a* or the destination node 620*b* larger than a threshold distance (e.g., five-hundred miles). For example, the first handling node 620*a* may be two-hundred miles from source node 610*a* but one-thousand miles away from the destination node 620*b*, so any connected network paths involving the first handling node 620*a* can be removed from the variables for the first stage of the optimization model.

In an example, the optimization model receives the remaining candidate network paths, along with inputs (e.g., inputs 310) and node constraints (e.g., constraints 320) to determine the network path between the source node 610*a* and the destination node 620*b*. As indicated by the solid line in FIG. 6, the optimization model can select the direct network path between the source node 610*a* and the destination node 620*b* based on a resulting value of an optimization parameter (e.g., cost or resource usage).

Figure 7:
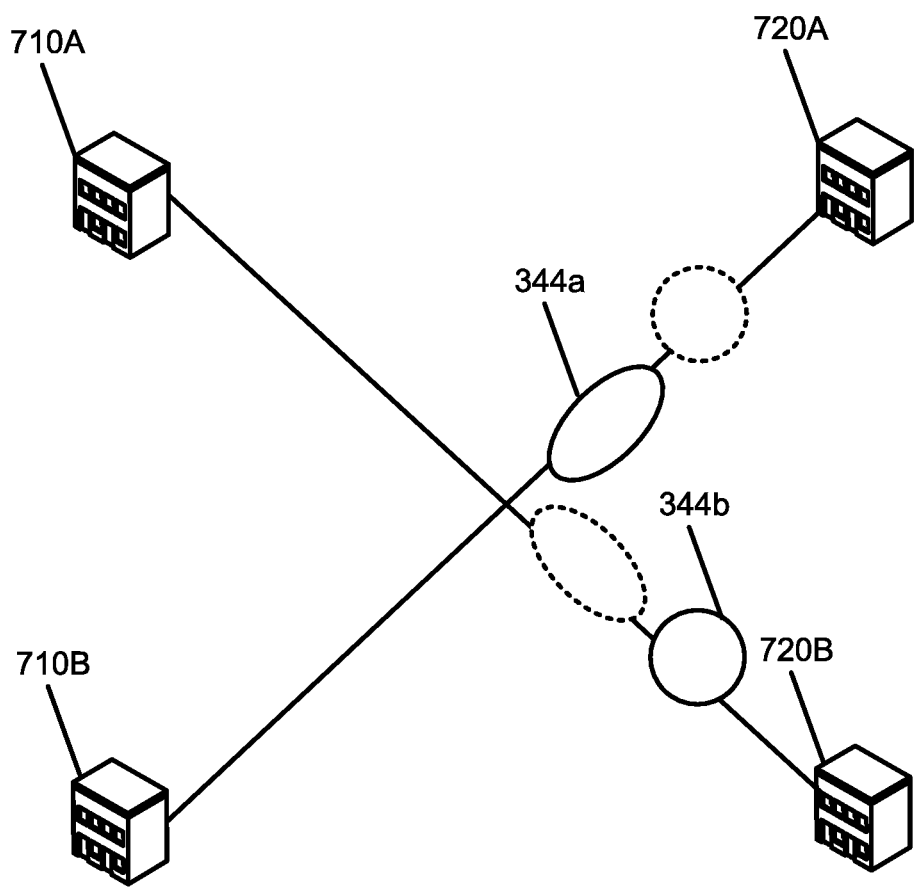
FIG. 7 illustrates an example of determining an item handling type combination for a network path between a source node and a destination node, according to an embodiment of the present disclosure.

FIG. 7 illustrates an example of determining an item handling type combination for a network path between a source node and a destination node, according to an embodiment of the present disclosure. A management system (e.g., management system 130 in FIG. 1) may determine the network path.

In an example, a network path can be determined between a source node 710 and a destination node 720. An item handling type may vary for the network path based on inputs of a forecasted demand of items, transportation costs for the items, the network definition, the delivery methods, time constraints for transporting the items, and node constraints. As illustrated, a first network path from source node 710*a* to destination node 720*b* includes a first item handling type 344*a*, and a second network path from source node 710*b* to destination node 720*a* includes a second item handling type 344*b*. For example, an optimization model can receive the forecasted demand per each pair, the associated costs for each node pair, the set of constraints of the handling nodes, and the network paths that were selected. The possible combination of item handling types is varied along each network path. The optimization model (e.g., the objective function) searches for the most optimum solution (e.g., the solution that is least costly to transport items from the different source nodes to the different destination nodes), where this optimum solution is found by determining the cost for the different combinations that the variable can take and selecting the combination that provides the least cost as the optimum solution. As illustrated, the optimization model can select the first item handling type 344*a* for the network path involving the source node 710*a* and the destination node 720*b*, and the second item handling type 344*b* for the network path involving the source node 710*a* and the destination node 720*b*.

Figure 8:
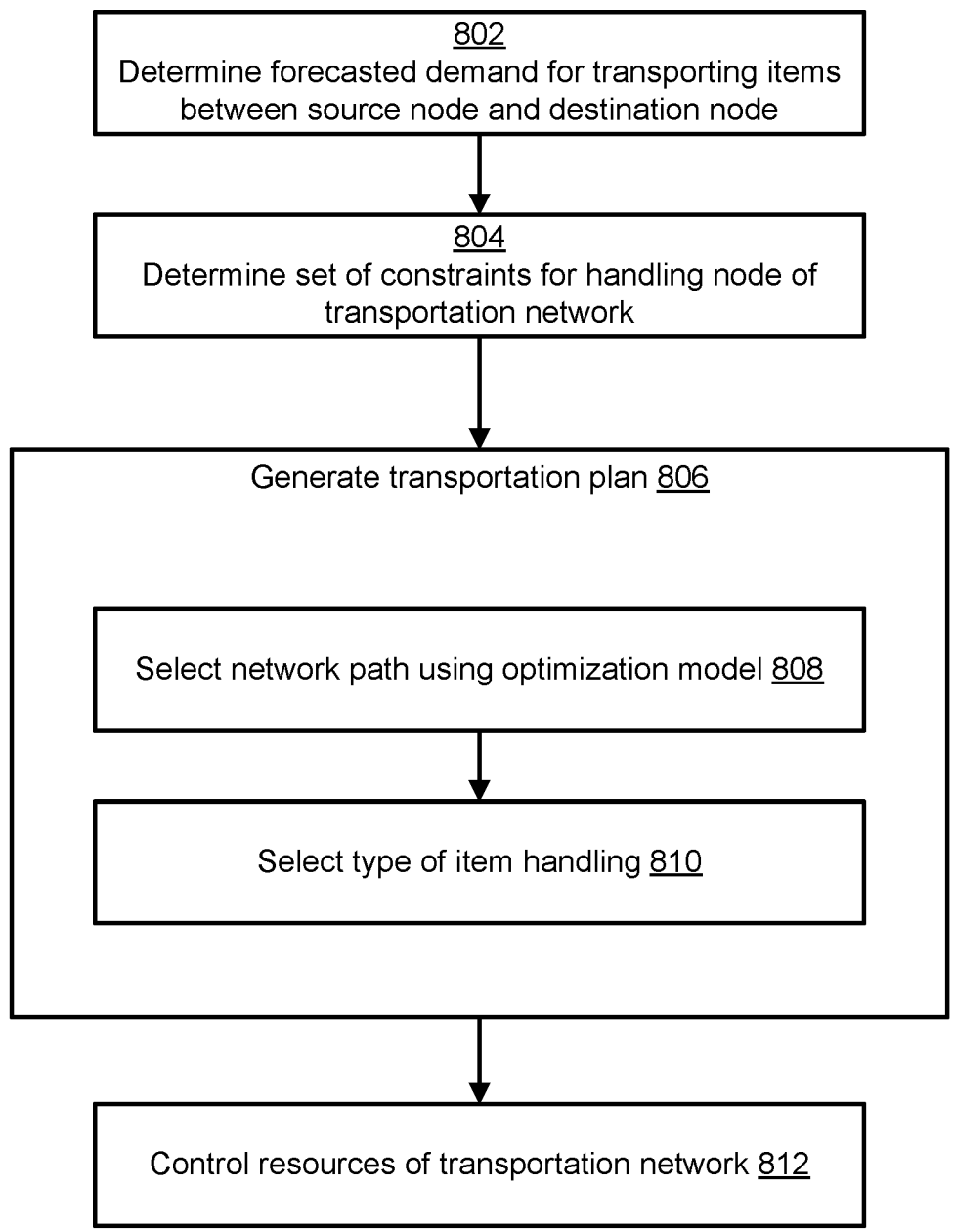
FIG. 8 illustrates an example of a flow for generating a transportation plan for a source node and destination node pair, according to an embodiment of the present disclosure.

FIG. 8 illustrates an example of a flow for generating a transportation plan for a source node and destination node pair, according to an embodiment of the present disclosure. The optimization to generate the transportation plan may be performed at a global scale with multiple source nodes and/or destination nodes. Operations of the flow can be performed by a management system, such as the management system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 802, where the management system determines a forecasted demand for transporting items between a source node and a destination node. The forecasted demand can be for a given time period.

The forecasted demand may be based on previous demand for transporting items between the source node and the destination node in the given time period. The source node and the destination node are part of a transportation network.

In an example, the flow includes operation 804, where the management system determines a set of constraints for a handling node of the transportation network. The handling node is configured to handle items during transportation from the source node to the destination node. The set of constraints can include an item handling throughput of the handling node, types of item handling supported by the handling node, and/or a number of sortation points from the handling node.

In an example, the flow includes operation 806, where the management system generates a transportation plan. The transportation plan is generated by an optimization model (e.g., the optimization model 132 in FIG. 1) and includes a network path that is within the transportation network, includes the handling node, and connects the source node and the destination node. The transportation plan also includes a type of item handling at each node of the network path. The optimization model receives the forecasted demand, the set of constraints, uses network paths and types of item handling as variables, and optimizes an optimization parameter (e.g., cost or resource-usage) of the transportation network. The management system generates the transportation plan by performing operation 808 and 810.

In an example, the flow includes operation 808, where the management system selects a network path using the optimization model. The optimization parameter can be optimized to select the network path from the network paths. The network path can be selected based on a resulting value of the optimization parameter.

In an example, the flow includes operation 810, where the management system selects a type of item handling. The optimization parameter can be optimized to select the type of item handling for the handling node from the types of item handling. The optimization model can use candidate combination of types of item handlings and not the network paths as variables. The type of item handling can be selected based on another resulting value of the optimization parameter.

For selected network paths that involve a single handling node, the type of item handling can be determined during a single stage of optimization of the optimization model. For example, the optimization model determines the selected network path includes a single handling node in the first stage. Then, also during the first stage, the optimization model determines an item handling combination for the selected network path from candidate item handling combinations available at the single handling node.

In an example, the flow includes operation 812, where the management system controls resources of the transportation network. The resources can be controlled based on the transportation plan. Resources may be controlled so as to improve throughput and resource usage of the network path.

Figure 9:
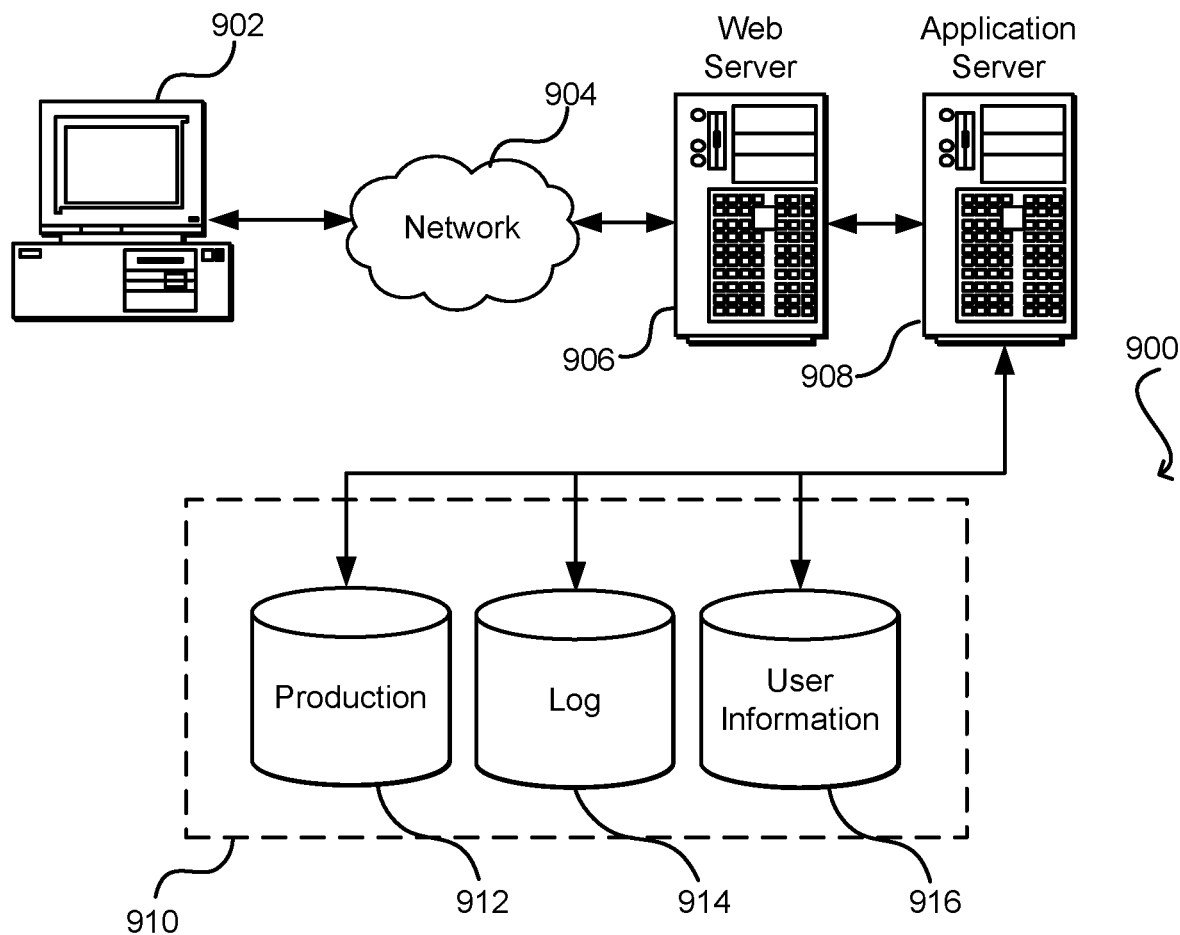
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    determining a forecasted demand for transporting items between a source node and a destination node of a transportation network;
    determining a set of constraints associated with a handling node of the transportation network, the handling node being between the source node and the destination node and associated with an inventory management system configured to control handling equipment of the handling node, the set of constraints comprising a throughput of the handling node and a limit on a number of network paths into or out of the handling node;
    determining a set of costs associated with transportation of the items from the source node to the destination node;
    generating, by using an optimization model, a transportation plan that controls deployment of resources of the transportation network and that comprises (i) a network path that is within the transportation network, includes the handling node, and connects the source node and the destination node, and (ii) a type of item handling at each node of the network path, wherein:
        the optimization model receives the forecasted demand, the set of constraints, and the set of costs as inputs, uses network paths and types of item handling as variables, and optimizes an optimization parameter of the transportation network,
        the transportation plan is generated by at least:
            in a first stage:
                ranking source node-destination node pairs based on a total volume of items and a total number if item handlings between each node-destination node pair;
                generating, from the source node-destination node pairs, a first subset of the source node-destination node pairs and a second subset of the source node-destination node pairs, the first subset associated with a higher ranking than the second subset;
                determining first network paths for the first subset and second network paths for the second subset;
                executing the optimization model a first time to optimize the optimization parameter, the executing at the first time using the inputs, using the first network paths as first variables, forgoing use of the types of item handling, and outputting first selected network paths from the first variables subject to at least the limit on the number of network paths, the first selected network paths comprising the network path, and
                executing the optimization model a second time to optimize the optimization parameter, the executing at the second time using the inputs, using the second network paths as second variables, forgoing use of the types of item handling, and outputting second selected network paths from the second variables subject to at least the limit on the number of network paths, and in a second stage, executing the optimization model a third time to re-optimize the optimization parameter, the executing at the third time using the inputs, using the first and second selected network paths as additional inputs, using the types of item handling as third variables that vary between at least item cross-docking of items and item sorting, and outputting a first type of item handling for the handling node from the second variables subject to at least the throughput of the handling node, a subset of the items to be handled at the handling node according to the first type of item handling, and a second type of item handling for another handling node to handle another subset of the items; and outputting at least a portion of the transportation plan to the inventory management system, wherein outputting the transportation plan comprises controlling operations of one or more unmanned vehicles based at least in part on the transportation plan thereby causing an improvement to operations of the unmanned vehicles based at least in part on transportation plan.

2. The computer-implemented method of claim 1, wherein the transportation plan is generated further by at least:

generating, for a pair of the source node and the destination node, candidate network paths that are within the transportation network and that connect the pair;

generating, for a candidate network path of the candidate network paths, candidate combinations of the types of item handling across nodes of the candidate network path, wherein each candidate combination and the candidate network path represent a different candidate transportation plan; and in the first stage, using the candidate network paths and not the candidate combinations as variables of the optimization model.

3. The computer-implemented method of claim 2, wherein the transportation plan is generated further by at least:

in the first stage, selecting the network path from the candidate network paths based at least in part on a first resulting value of the optimization parameter;

in the second stage, using the candidate combinations and not the candidate network paths as variables of the optimization model; and in the second stage, selecting a combination from the candidate combinations based at least in part on a second resulting value of the optimization parameter, wherein the combination comprises the type of item handling for the handling node.

4. The computer-implemented method of claim 3, wherein the transportation plan is generated further by at least removing unselected candidate network paths from the executing of the second stage.

5. The computer-implemented method of claim 1, wherein the transportation plan is generated by at least:

executing, in the first stage, a program module by providing the inputs to the program module, wherein the program module stores the optimization model as a set of equations; and executing, in the second stage, the program module again by providing the inputs and the additional inputs to the program module.

6. A computer system comprising:
one or more processors; and
one or more memories storing computer-readable instructions that, upon execution by the one or more processors, configure the computer system to:

determine a forecasted demand for transporting items between a source node and a destination node of a transportation network;

determine a set of constraints associated with a handling node of the transportation network, the handling node associated with an inventory management system configured to control handling equipment of the handling node, the set of constraints comprising a throughput of the handling node and a limit on a number of network paths into or out of the handling node;

generate, based at least in part on the forecasted demand and set of constraints, a transportation plan that controls deployment of resources of the transportation network and that comprises (i) a network path including the handling node and (ii) a type of item handling at the handling node, wherein:

the transportation plan is generated by at least:
in a first stage of optimization:
ranking source node-destination node pairs based on a total volume of items and a total number if item handlings between each node-destination node pair;

generating, from the source node-destination node pairs, a first subset of the source node-destination node pairs and a second subset of the source node-destination node pairs, the first subset associated with a higher ranking than the second subset;

determining first network paths for the first subset and second network paths for the second subset;

executing, by at least using the first network paths as first variables and forgoing use of item handling types, an optimization model a first time to optimize an optimization parameter, the executing at the first time outputting first selected network paths from the first variables subject to at least the limit on the number of network paths, the first selected network paths comprising the network path, and executing, by at least using the second network paths as second variables and forgoing the use of item handling types, the optimization model a second time to optimize the optimization parameter, the executing at the second time outputting second selected network paths from the second variables subject to at least the limit on the number of network paths, and in a second stage of optimization, executing the optimization model a third time to re-optimize the optimization parameter, the executing at the third time using the first and second selected network paths as additional inputs and outputting an indication of the type of item handling item handling types available at the handling node subject to at least the throughput of the handling node, a subset of the items to be handled at the handling node according to the type of item handling, and another type of item handling for another handling node to handle another subset of the items; and outputting the transportation plan to the inventory management system, wherein outputting the transportation plan comprises controlling operations of one or more unmanned vehicles based at least in part on the transportation plan thereby causing an improvement to operations of the unmanned vehicles based at least in part on transportation plan.

7. The computer system of claim 6,
wherein the second stage is performed after the first stage is performed for at least the first subset and the second subset.

8. The computer system of claim 7, wherein the first stage is performed for the first subset prior to being perform for the second subset based at least in part on the first subset having the higher ranking than the second subset.

9. The computer system of claim 7, wherein the network path is ranked by generating a ranking value based at least in part on a total volume of the items and a total number of item handling to handle the items across the network path.

10. The computer system of claim 9, wherein the ranking value of the network path is equal to a ratio of the total volume and the total number.

11. The computer system of claim 6, wherein the optimization model comprises an objective function that receives the forecasted demand, the set of constraints, and a set of costs as inputs, uses the network paths and the item handling types as variables, and optimizes an optimization parameter of the transportation network.

12. The computer system of claim 6, wherein the set of constraints comprises a network path constraint and a capacity constraint, wherein the network path constraint indicates a total number of network paths connected with the handling node, and wherein the capacity constraint indicates an item handling throughput of the handling node.

13. The computer system of claim 6, wherein the one or more memories store additional computer-readable instructions that, upon execution by the one or more processors, further configure the computer system to:
generate, for a pair of the source node and destination node, connected network paths that connect the source node and the destination node; and
select the network paths from the connected network paths based at least in part on a set of rules specifying a time constraint for the transporting of the items, wherein the network path is selected based at least in part on a determination that a time for transporting the items along the network path meets the time constraint.

14. The computer system of claim 13, wherein the set of rules further specifies that a connected network path having a total number of handling nodes between the source node and the destination node is to be considered in the first stage if the total number is less than a threshold number.

15. The computer system of claim 13, wherein the set of rules further specifies that a connected network path is to be removed if one or more handling nodes of the connected network path are at distance away from the source node or the destination node larger than a threshold distance.

16. The computer system of claim 13, wherein the set of rules further specifies that a connected network path is to be removed if a total number of handling nodes of the connected network path is larger than a threshold number.

17. One or more non-transitory computer-readable storage media storing instructions that, upon execution on a computer system, cause the computer system to perform operations comprising:

determining a forecasted demand for transporting items between a source node and a destination node of a transportation network;
determining a set of constraints associated with a handling node of the transportation network, the handling node associated with an inventory management system configured to control handling equipment of the handling node, the set of constraints comprising a throughput of the handling node and a limit on a number of network paths into or out of the handling node;
generating, based at least in part on the forecasted demand and set of constraints, a transportation plan that controls deployment of resources of the transportation network and that comprises (i) a network path including the handling node and (ii) a type of item handling at the handling node, wherein:
the transportation plan is generated by at least:
in a first stage of optimization:
ranking source node-destination node pairs based on a total volume of items and a total number if item handlings between each node-destination node pair;
generating, from the source node-destination node pairs, a first subset of the source node-destination node pairs and a second subset of the source node-destination node pairs, the first subset associated with a higher ranking than the second subset;
determining first network paths for the first subset and second network paths for the second subset;
executing, by at least using the first network paths as first variables and forgoing use of item handling types, an optimization model a first time to optimize an optimization parameter, the executing at the first time outputting first selected network paths from the first variables subject to at least the limit on the number of network paths, the first selected network paths comprising the network path, and
executing, by at least using the second network paths as second variables and forgoing the use of item handling types, the optimization model a second time to optimize the optimization parameter, the executing at the second time outputting second selected network paths from the second variables subject to at least the limit on the number of network paths, and
in a second stage of optimization, executing the optimization model a second time to re-optimize the optimization parameter, the executing at the first time indicating the type of item handling as a second output selection from types of item handling available at the handling node subject to at least the throughput of the handling node, a subset of the items to be handled at the handling node according to the type of item handling, and another type of item handling for another handling node to handle another subset of the items, and
the optimization model uses item handling types as third variables that vary between at least item cross-docking of items and item sorting; and
outputting the transportation plan to the inventory management system, wherein outputting the transportation plan comprises controlling operations of one or more unmanned vehicles based at least in part on the transportation plan thereby causing an improvement to operations of the unmanned vehicles based at least in part on transportation plan.

18. The one or more non-transitory computer-readable storage media of claim 17, wherein the transportation plan is generated further by at least:
   generating, for a pair of the source node and the destination node, candidate network paths that are within the transportation network and that connect the pair; and
   in the first stage, using the candidate network paths as variables of the optimization model.

19. The one or more non-transitory computer-readable storage media of claim 18, wherein the transportation plan is generated further by at least:
   in the first stage, selecting the network path from the candidate network paths based at least in part on a first resulting value of the optimization parameter;
   determining, for the network path, candidate combinations of the item handling types across nodes of the network path; and
   in the second stage, using the candidate combinations as variables of the optimization model; and
   in the second stage, selecting a combination from the candidate combinations based at least in part on a second resulting value of the optimization parameter, wherein the combination comprises the type of item handling for the handling node.

20. The one or more non-transitory computer-readable storage media of claim 18, wherein the transportation plan is generated further by at least:
   determining that a candidate network path of the candidate network paths includes a single handling node; and
   determining, for the candidate network path, a candidate combination from candidate combinations of item handling types available at the single handling node by at least using the candidate combinations as variables in the first stage.

* * * * *